(12) United States Patent
Uchiyama et al.

(10) Patent No.: US 7,287,759 B2
(45) Date of Patent: Oct. 30, 2007

(54) STABILIZER DEVICE

(75) Inventors: Masaaki Uchiyama, Tokyo-to (JP);
Nobuyuki Ichimaru, Yokohama (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 345 days.

(21) Appl. No.: 10/925,422

(22) Filed: Aug. 25, 2004

(65) Prior Publication Data
US 2005/0067798 A1 Mar. 31, 2005

(30) Foreign Application Priority Data
Sep. 30, 2003 (JP) ............................ 2003-342490

(51) Int. Cl.
*B60G 21/055* (2006.01)
(52) U.S. Cl. .............................. 280/5.511; 280/124.107
(58) Field of Classification Search ............ 280/5.511, 280/124.107, 5.506, 5.509, 125.152, 125.137
See application file for complete search history.

(56) References Cited

U.S. PATENT DOCUMENTS

| | | | |
|---|---|---|---|
| 4,973,077 A * | 11/1990 | Kuwayama et al. .. | 280/124.107 |
| 6,318,737 B1 * | 11/2001 | Marechal et al. ......... | 280/5.511 |
| 6,361,033 B1 * | 3/2002 | Jones et al. ................. | 267/187 |
| 6,533,294 B1 * | 3/2003 | Germain et al. ......... | 280/5.511 |
| 7,100,926 B2 * | 9/2006 | Osterlanger et al. ..... | 280/5.502 |
| 2004/0262858 A1 * | 12/2004 | Ersoy ...................... | 280/5.511 |

* cited by examiner

*Primary Examiner*—Paul N. Dickson
*Assistant Examiner*—Drew J. Brown
(74) *Attorney, Agent, or Firm*—Brinks Hofer Gilson & Lione

(57) ABSTRACT

The piston 10 is constituted so as to rotate relative to the first cylinder 8 while moving relative to the first cylinder 8 in the axial direction when fluid is supplied to and discharged from the interior of the first cylinder 8, and the piston 16 is constituted to be incapable of rotation relative to the second cylinder 9, but capable of movement relative to the second cylinder 9 in the axial direction. Hence when fluid is supplied to and discharged from the interior of the first cylinder 8, the piston 10 is caused to rotate relative to the first cylinder 8 while moving relative to the first cylinder 8 in the axial direction, and the piston 16 is caused to move relative to the second cylinder 9 in the axial direction but prevented from rotating relative to the second cylinder 9. As a result, torsional elasticity is generated in shaft portions 4a and 5a.

17 Claims, 13 Drawing Sheets

STABILIZER DEVICE

This application claims priority under 35 U.S.C. §119 to Japanese Patent Application No. 2003-342490 filed Sep. 30, 2003, the entire content of which is hereby incorporated by reference.

BACKGROUND OF THE INVENTION

1. Field of the Invention

The present invention relates to a stabilizer device installed in a vehicle such as an automobile, which is capable of favorably preventing rolling movements of a vehicle body.

2. Description of the Related Art

Examples of known conventional stabilizer devices installed in a vehicle such as an automobile include the stabilizer device disclosed in Japanese Unexamined Patent Application Publication H4-342611. The stabilizer device of this prior art is provided with a rotary actuator that comprises a cylindrical housing in which a guiding member protrudes inward and a space having a cruciform cross section is formed in the interior thereof, and a rotor portion provided in the space in the cylindrical housing, the rotor portion comprising a cylindrical portion and a vane portion. The rotary actuator is provided between two stabilizer units each functionally attached to the wheel shaft for the right, or left, wheel.

By supplying oil into a fluid chamber located on one side of the vane portion formed in the rotor portion, and discharging fluid from another fluid chamber located on the other side, the rotor portion can be rotated relative to the cylindrical housing. This rotation generates torsional elasticity in the stabilizer so that tilting motion of the vehicle body can be reduced when the vehicle turns, for example, thereby improving vehicle's traveling stability.

The stabilizer device of the prior art described above comprises a sealing member that extends in the axial direction of the cylindrical housing. The sealing member is provided on an apex portion of the guiding member within the cylindrical housing. There is provided another sealing member which extends in the axial direction and whose two end portions are bent at a substantial right angle at its two end portions. The other sealing member is provided on an apex portion and an axial end portion of the vane portion in the rotor portion. These sealing members function to seal the fluid chambers formed on both sides of the vane portion.

In the prior art, therefore, four groups of sealing members having a length long enough to substantially encircle the vane portion are required. Because of this, assembly work of the sealing members is complex. If the assembly work is not conducted with great care, the sealing members may become partially worn in a short time, causing problems such as a fluid leakage. Such a fluid leakage reduces the torsional elasticity of the stabilizer and degrades the ability to control rolling motion of the vehicle body.

SUMMARY OF THE INVENTION

An object of the present invention is to provide a stabilizer device which employs an easy-to-seal linear type cylinder device as an actuator of the stabilizer device, thereby eliminating problems such as the complex assembly work required for sealing members in a rotary actuator, and fluid leakage or the like caused by partial wear of the sealing members.

The present invention is a stabilizer device comprising a stabilizer constituted by a shaft portion mounted on a vehicle body side and arm portions which are attached to left and right wheel sides by bending each side of the shaft portion, and an actuator which divides the stabilizer into two at the shaft portion so as to produce a rotary angle difference between the respective shaft portions of the divided shaft portion. In this stabilizer device, the actuator comprises: a cylinder connected to one of the shaft portions; a piston provided within the cylinder so as to be capable of movement in an axial direction, the piston dividing the interior of the cylinder into two chambers to and from which a pressure fluid is supplied and discharged; a piston rod having one end connected to the piston and another end extending outward from the cylinder to be connected to the other shaft portion; and a linear motion-rotary motion conversion mechanism which causes the piston and the piston rod to rotate relative to the cylinder when the piston moves in the axial direction.

By means of such a constitution, the piston and piston rod are caused to rotate relative to the cylinder when fluid is supplied to and discharged from the interior of the cylinder, and hence torsional elasticity can be generated between the two shaft portions. Furthermore, by using a linear type cylinder device, in which a piston moves in an axial direction within a cylinder, as the actuator, sealing can be performed easily.

In the invention described above of the present invention, the piston rod and the other shaft portion may be connected via an axial motion permitting mechanism which prohibits relative rotation but permits relative axial motion.

By means of such a constitution, movement of the piston and piston rod relative to the cylinder in the axial direction is absorbed by the axial motion permitting mechanism, and hence the shaft portions do not approach and separate when the actuator is driven.

Further, in the present invention the actuator comprises: a cylinder connected to one of the shaft portions; a piston provided within the cylinder so as to be capable of movement in an axial direction, the piston dividing the interior of the cylinder into two chambers to and from which a pressure fluid is supplied and discharged; a piston rod having one end connected to the piston and another end extending outward from the cylinder; and an axial motion permitting mechanism which prohibits relative rotation and permits relative axial motion of the piston and the piston rod relative to the cylinder. The piston rod and the other shaft portion are connected via a linear motion-rotary motion conversion mechanism which converts the axial motion of the piston rod into a rotary motion toward the other shaft portion.

By means of such a constitution, the piston and piston rod are caused to move relative to the cylinder in the axial direction when fluid is supplied to and discharged from the interior of the cylinder, and this relative axial motion is converted into a rotary motion by the linear motion-rotary motion conversion mechanism. As a result, torsional elasticity can be generated between the two shaft portions. Moreover, by using a linear type cylinder device, in which a piston moves in an axial direction within a cylinder, as the actuator, sealing can be performed easily.

Further, in the present invention the actuator comprises: a first cylinder connected to one of the shaft portions, and a second cylinder connected to the other of the shaft portions; a first piston and a second piston provided in the respective interiors of the cylinders, which divide each of the cylinders into two chambers; a piston rod provided such that one end thereof is connected to each of the pistons; a linear motion-rotary motion conversion mechanism which causes the first piston and the piston rod to rotate relative to the first cylinder when the first piston moves in the axial direction; and an axial motion permitting mechanism which prohibits relative rotation and permits relative axial motion of the second piston and the piston rod relative to the second cylinder. Pressure fluid is supplied to and discharged from at least either the two chambers of the first cylinder or the two chambers of the second cylinder.

By means of such a constitution, the first piston and piston rod are caused to rotate relative to the first cylinder and the second piston and piston rod are caused to move relative to the second cylinder in the axial direction when fluid is supplied to and discharged from the interior of at least one of the cylinders. As a result, torsional elasticity can be generated between the two shaft portions. Moreover, by using a linear type cylinder device, in which a piston moves in an axial direction within a cylinder, as the actuator, sealing can be performed easily.

DESCRIPTION OF THE PREFERRED EMBODIMENTS

Figure 1:
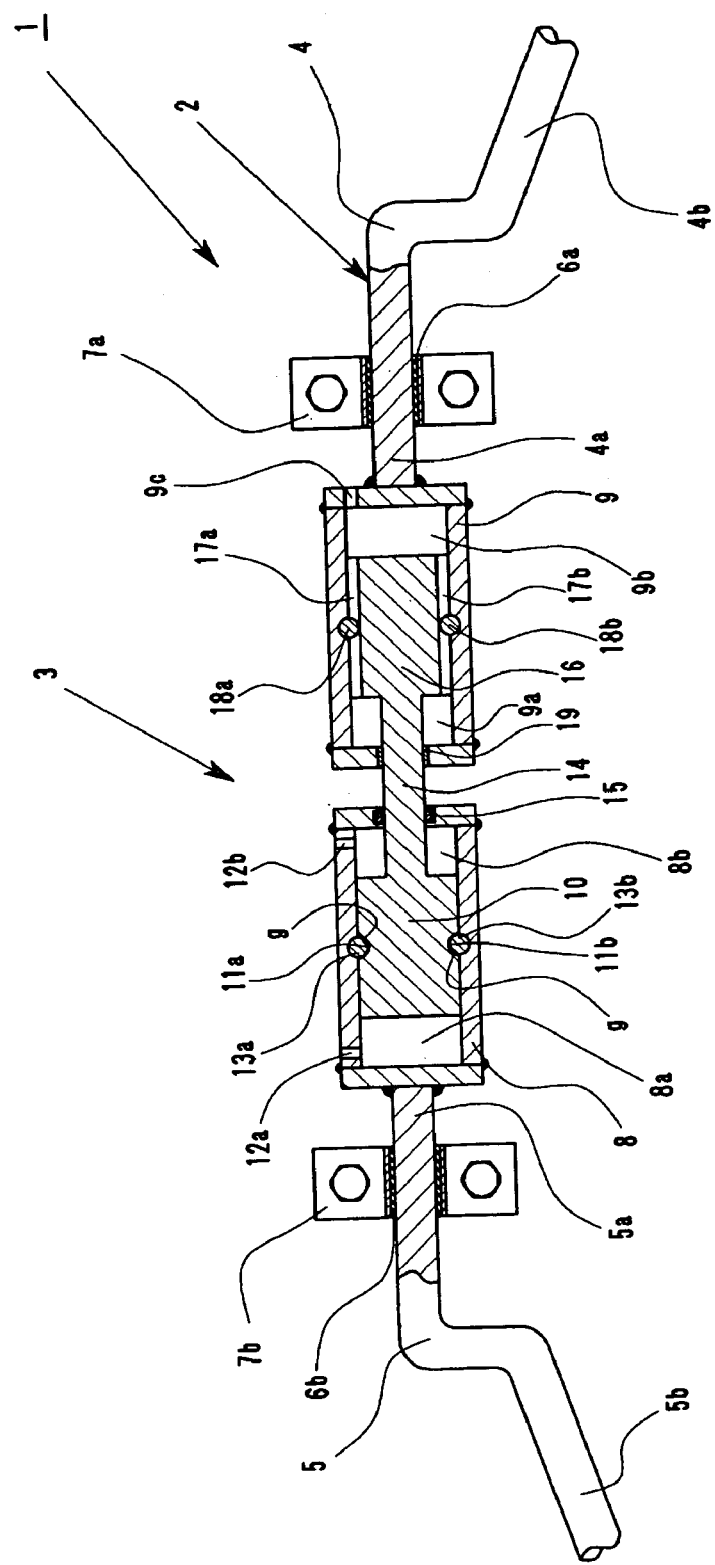
FIG. 1 is a partial sectional view showing a stabilizer device according to a first embodiment of the present invention.

A first embodiment of the present invention will be described below using FIGS. 1 through 5.

A stabilizer device 1 is attached to the vehicle body between the left and right wheel shafts of the vehicle (none of which are shown in the drawing) It comprises a stabilizer 2 formed from flexible spring steel and an actuator 3. The stabilizer 2 is comprised of two parts, a first stabilizer 4 and a second stabilizer 5, located respectively at both ends of a shaft portion which is mounted substantially at the center of the vehicle body.

The first stabilizer 4 and second stabilizer 5 are comprised of shaft portions 4a and 5a and arm portions 4b and 5b, respectively. The stabilizers 4 and 5 are bent at the respective ends of the shaft portions 4a and 5a, as shown in the drawing, so that the other ends thereof (not shown) can be attached to the left and right wheel shafts of the vehicle, respectively.

The shaft portion 4a of the first stabilizer 4 and the shaft portion 5a of the second stabilizer 5 are attached rotatably and resiliently to the vehicle body by bearing members 7a, 7b via elastic members 6a, 6b, respectively.

The actuator 3 comprises a first cylinder 8 (cylinder) and a second cylinder 9. A base portion side of the first cylinder 8 (the left side of the cylinder 8 in the drawing) is connected to the shaft portion 5a of the second stabilizer 5 by welding, and a base portion side of the second cylinder 9 (the right side of the cylinder 9 in the drawing) is connected to the shaft portion 4a of the first stabilizer 4 by welding.

A piston 10, which divides the first cylinder 8 into two cylinder chambers 8a and 8b, is provided in the first cylinder 8. As is clearly shown in FIG. 2, spiral grooves 11a and 11b are formed in the circumference of the piston 10.

Rigid balls 13a and 13b are partially and rotatably inserted in the inner peripheral wall of the first cylinder 8 at a location substantially bisecting the cylinder 8 in the axial direction. The rigid balls 13a and 13b are partially received in the grooves 11a and 11b of the piston 10. The rigid balls 13a, 13b and the grooves 11a, 11b constitute a linear motion-rotary motion conversion mechanism of the present invention.

A narrow gap g is formed between the rigid balls 13a, 13b and the grooves 11a, 11b. Oil flowing between the cylinder chambers 8a, 8b is orificed by the gap g.

Supply/discharge ports 12a and 12b for supplying and discharging oil (fluid) to and from the cylinder chambers 8a, 8b are provided through the wall of the first cylinder 8 near the ends of the cylinder, respectively, as shown in the drawing. A hydraulic circuit A to be described below is connected to the supply/discharge ports 12a, 12b.

The left end of a piston rod 14 is connected to the piston 10. The central portion of the piston rod 14 extends outside of the first cylinder 8 through a sealing member 15, and is thus exposed to the outside. The sealing member 15 is constituted by an O-ring formed of an elastic body, such as rubber, and is fitted to work with the piston rod 14 to prevent an oil leak from the cylinder chamber 8b.

A piston 16, which divides the second cylinder 9 into two cylinder chambers 9a and 9b, is provided in the second cylinder 9. As is clearly shown in FIG. 2, grooves 17a and 17b which extend in the axial direction are formed in the circumference of the piston 16.

Rigid balls 18a and 18b are partially and rotatably inserted in the inner peripheral wall of the second cylinder 9 at a location substantially bisecting the cylinder 9 in the axial direction. The rigid balls 18a and 18b are partially received in the grooves 17a and 17b of the piston 16. The rigid balls 18a, 18b and the grooves 17a, 17b constitute an axial motion permitting mechanism of the present invention. This axial movement permitting mechanism is connected to the piston rod 14 via the piston 16, and to the shaft portion 4a via the second cylinder 9, and thus links the piston rod 14 to the shaft portion 4a.

The interior of the second cylinder 9 communicates with the atmosphere through a communication hole 9c. The communication hole 9c enables volume compensation when the piston rod 14 is inserted into and withdrawn from the second cylinder 9.

The right end of the piston rod 14 is connected to the piston 16. The central portion of the piston rod 14 extends outside of the second cylinder 9 through a bearing 19, and is thus exposed to the outside. Note that the bearing 19 is formed of a material having low frictional resistance, such as polytetrafluoroethylene.

Here, the first cylinder 8, the second cylinder 9, the piston 10, the rigid ball 13a (13b), the piston rod 14, the piston 16, and the rigid ball 18a (18b) are formed from steel with a high degree of hardness.

Next, the hydraulic circuit A for driving the above stabilizer device 1 will be described.

Figure 3:
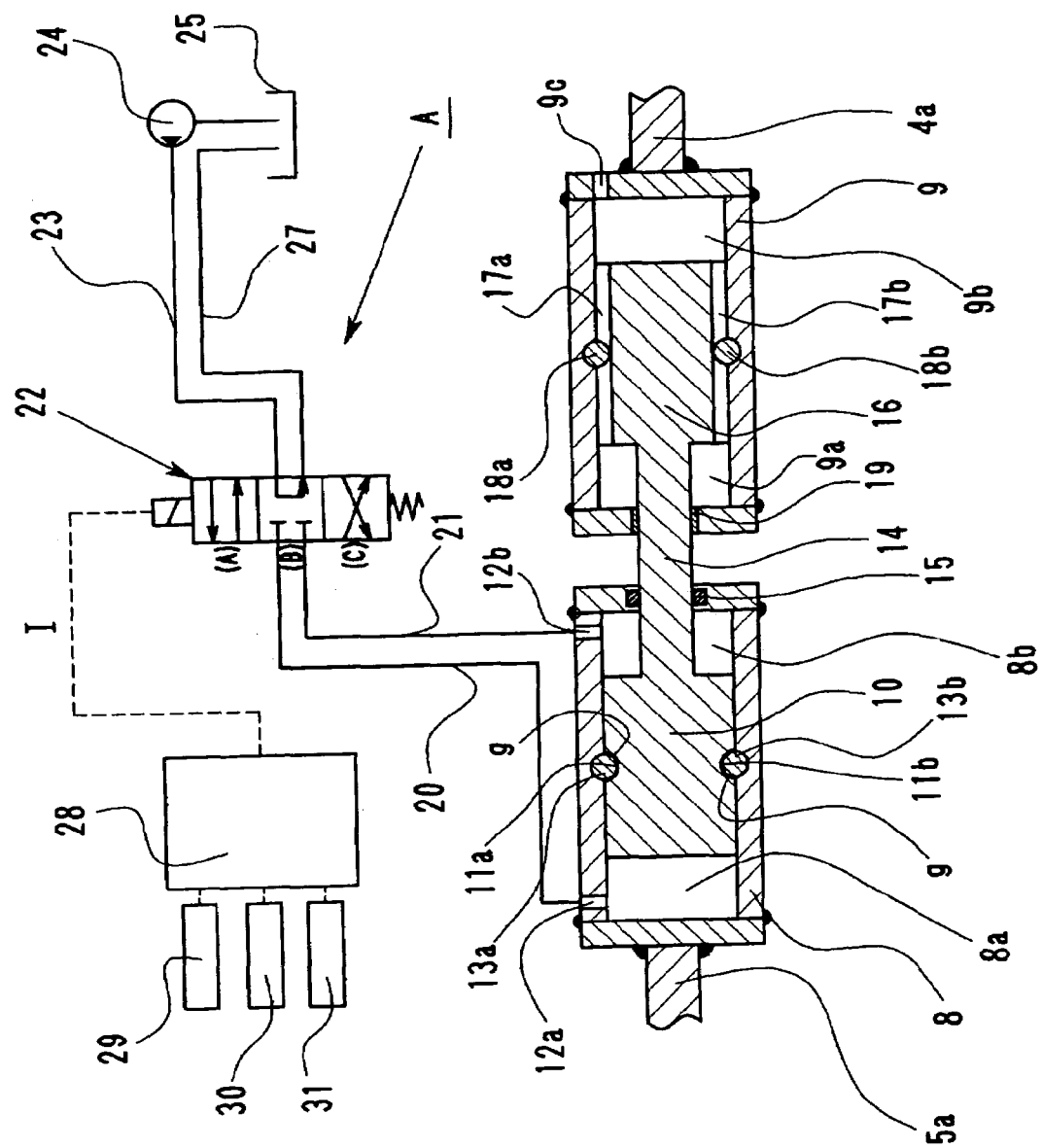
FIG. 3 is a view showing a hydraulic circuit (during straight traveling) which drives the stabilizer device shown in FIG. 1.

As shown in FIG. 3, one ends of supply/discharge pipes 20 and 21 are connected respectively to the supply/discharge ports 12a, 12b, which are formed through the wall of the first cylinder 8. The other ends of the supply/discharge pipes 20, 21 are connected to a supply/discharge control valve 22.

The discharge side of a hydraulic pump 24 which is driven by a driving mechanism (not shown) such as an engine, for example, is connected to a supply line 23, which is in turn connected to the supply/discharge control valve 22. The hydraulic pump 24 pumps oil from a reservoir tank 25 into the supply/discharge control valve 22.

A discharge line 27 connected to the supply/discharge control valve 22 is designed to return oil from the supply/discharge control valve 22 into the reservoir tank 25.

The supply/discharge control valve 22 is a four-port, three-position electromagnetic control valve which is driven to shift to one of three positions (A), (B), or (C) upon reception of a driving signal 1 from a control device 28 installed in a console box or the like (not shown) of the vehicle.

A vehicle speed sensor 29, a lateral acceleration sensor 30, and a steering angle sensor 31 are connected to the control device 28. The vehicle speed sensor 29 detects a traveling speed of the vehicle, the lateral acceleration sensor 30 detects an acceleration motion in the lateral direction acting on the vehicle body, and the steering angle sensor 31 detects a steering angle.

In response to detection signals from the vehicle speed sensor 29, the lateral acceleration sensor 30, and the steering angle sensor 31, the control device 28 estimates a rolling angle of the vehicle body to occur, and determines whether or not the estimated rolling angle exceeds a predetermined threshold. When the control device 28 determines that the estimated rolling angle does not exceed the threshold, the control device 28 outputs a driving current IB to the supply/discharge control valve 22 to place the supply/discharge control valve 22 at the position (B). If, on the other hand, the control device 28 determines that the estimated rolling angle does exceed the threshold, the control device 28 outputs a driving current IA or a driving current IC, depending on the direction of the steering angle (left or right), to the supply/discharge control valve 22 to shift the supply/discharge control valve 22 to either the position (A) or the position (C).

Next, operations of the first embodiment of the present invention will be described regarding the supply/discharge control valve 22 at the positions (A), (B), and (C).

[The Position (B) (When Traveling Straight)]

When the vehicle is traveling straight, for example, almost no rolling motion occurs to the vehicle body of the vehicle, and hence, as shown in FIG. 3, the supply/discharge control valve 22 is placed at the position (B) by the driving current IB supplied from the control device 28. In this case, communication between the supply/discharge pipes 20 and 21 the supply line 23 and discharge line 27 is blocked such that oil is sealed in the cylinder chambers 8a, 8b of the first cylinder 8. Accordingly, the piston 10 is held in a predetermined position (neutral position) within the first cylinder 8, as shown in FIG. 3, and therefore, no relative torsion occurs between the first stabilizer 4 and the second stabilizer 5, and no positive torsional elasticity is generated in the stabilizer device 1 by the actuator 3. Note that the supply line 23 is directly connected to the discharge line 27, and the oil from the hydraulic pump 24 is returned to the reservoir tank 25.

[The Position (A) (When Turning Left)]

Figure 4:
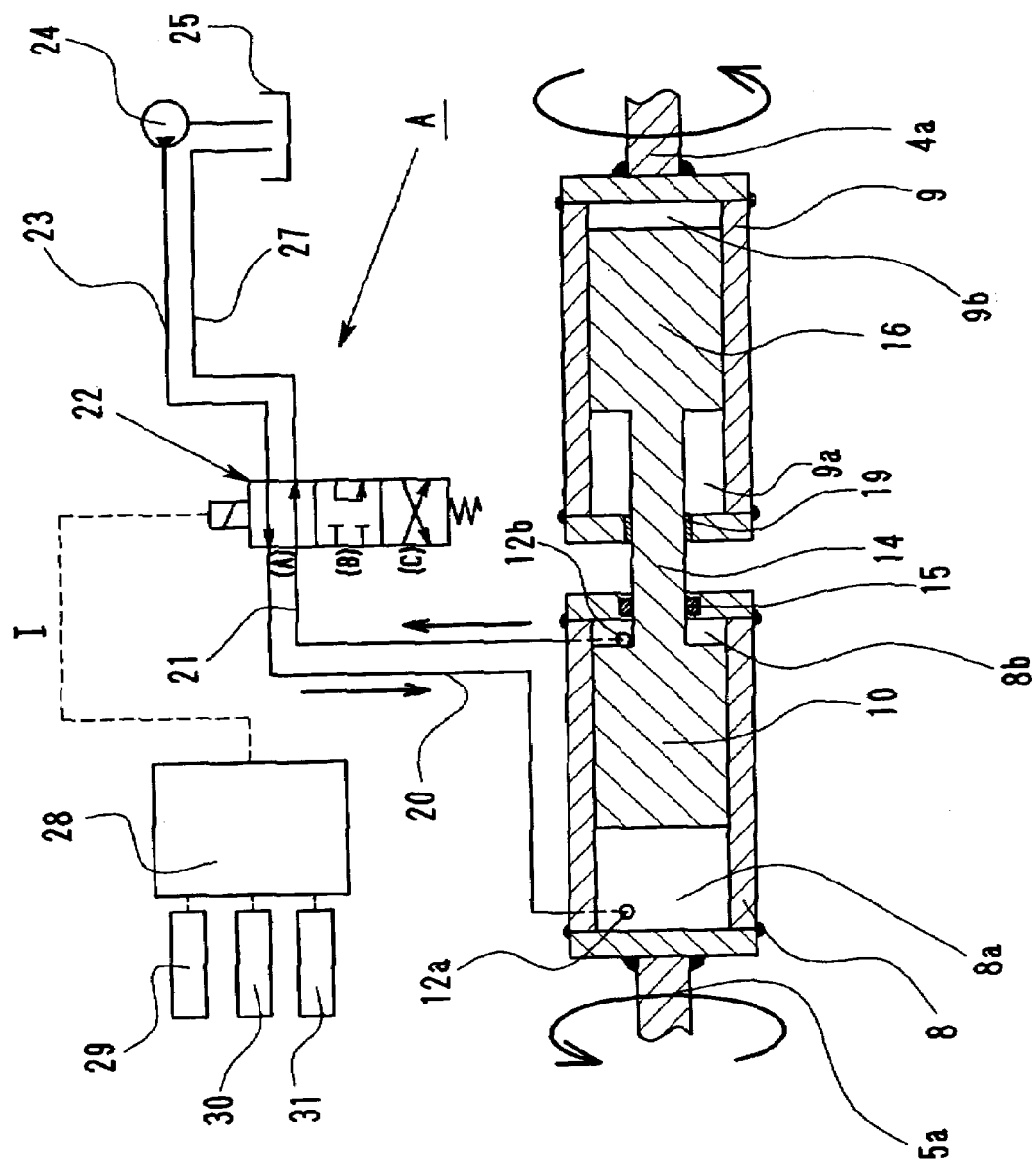
FIG. 4 is a view showing the hydraulic circuit (during left turning) which drives the stabilizer device shown in FIG. 1.

When the vehicle makes a left turn, for example, rolling motion will occur, and the right side of the vehicle body will go down. However, before such rolling motion occurs to the vehicle body during a left turn, the control device 28 receives detection signals from the vehicle speed sensor 29, the lateral acceleration sensor 30, and the steering angle sensor 31. Then, if an estimated rolling angle exceeds the threshold, the supply/discharge control valve 22 is shifted to the position (A) by the driving current IA supplied from the control device 28, as shown in FIG. 4. As a result, the supply/discharge pipe 20 is connected to the supply line 23, and the supply/discharge pipe 21 is connected to the discharge line 27, thereby causing oil to flow in the direction shown by the arrow in the drawing through the supply/discharge port 12a of the first cylinder 8 into the cylinder chamber 8a. This produces an increase in the pressure inside the cylinder chamber 8a. Oil in the cylinder chamber 8b thereby flows in the direction shown by the arrow in the drawing through the supply/discharge port 12b of the first cylinder 8 and is returned to the reservoir tank 25 via the supply/discharge control valve 22.

At this time, a small quantity of oil squeezingly flows from the cylinder chamber 8a into the cylinder chamber 8b through the gap g. However, this has substantially no effect on the increased pressure in the cylinder chamber 8a, and hence the increased pressure acts on the piston 10 in the direction which causes the piston 10 to move to the right in the drawing. The rigid balls 13a and 13b move relatively along the spiral grooves 11a and 11b, thereby causing the piston 10 to rotate relative to the first cylinder 8 while moving to the right (in the axial direction) in the drawing.

As the piston 10 moves in the axial direction and rotates relative to the first cylinder 8, the piston rod 14 and the piston 16 connected to the piston rod 14 also move in the axial direction and rotate relative to the first cylinder 8. At this time, the piston 16 is restricted from rotating relative to the second cylinder 9 due to the engagement between the rigid balls 18a, 18b and the grooves 17a, 17b extending in the axial direction. Therefore, the second cylinder 9 is also caused to rotate therewith. However, since the piston 16 moves relative to the second cylinder 9 in the axial direction, the shaft portion 4a of the first stabilizer 4 and the shaft portion 5a of the second stabilizer 5 rotate in the opposite directions, as shown by the arrows in the drawing, without separating from each other in the left/right direction of the drawing.

Note that FIG. 4 shows the embodiment in a state after the first cylinder 8 and the second cylinder 9 have rotated in the opposite directions. Note also that illustration of the rigid ball 13a (13b) and groove 11a (11b) constituting the linear motion-rotary motion conversion mechanism and the rigid ball 18a (18b) and groove 17a (17b) constituting the axial motion permitting mechanism is omitted in the drawing.

As described above, the first stabilizer 4 and the second stabilizer 5 rotate in the opposite directions, thereby creating a rotary angle difference therebetween. As a result, torsional elasticity is generated in the stabilizer device 1. This torsional elasticity acts to push the right wheels downward and pull the left wheels upward. Therefore, the stabilizer device 1 is able to actively suppress rolling motion which causes the right side of the vehicle body to go down when the vehicle performs a left turn.

[The Position (C) (When Turning Right)]

Figure 5:
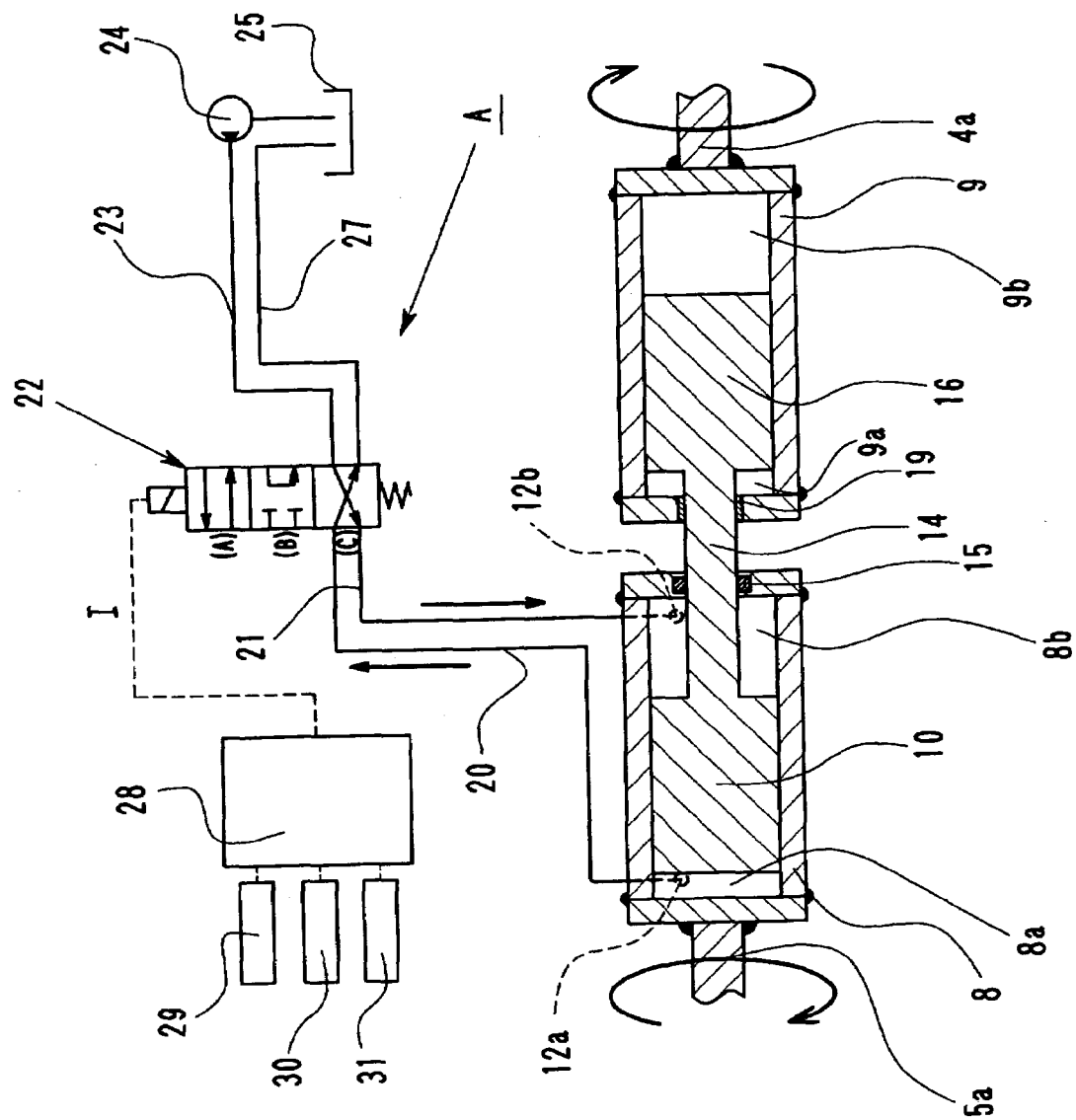
FIG. 5 is a view showing the hydraulic circuit (during right turning) which drives the stabilizer device shown in FIG. 1.

When the vehicle turns right, for example, rolling motion will occur in such a way that the left side of the vehicle body will go down. However, before such rolling motion occurs to the vehicle body during a right turn, the control device 28 receives detection signals from the vehicle speed sensor 29, the lateral acceleration sensor 30, and the steering angle sensor 31. Then, if an estimated rolling angle exceeds the threshold, the supply/discharge control valve 22 is shifted to the position (C) by the driving current IC supplied from the control device 28, as shown in FIG. 5. As a result, the supply/discharge pipe 20 is connected to the discharge line 27, and the supply/discharge pipe 21 is connected to the supply line 23, thereby causing oil to flow in the direction shown by the arrow in the drawing through the supply/discharge port 12*b* of the first cylinder 8 into the cylinder chamber 8*b*. This produces an increase in pressure in the cylinder chamber 8*b*, and the oil inside the cylinder chamber 8*a* flows in the direction shown by the arrow in the drawing through the supply/discharge port 12*a* of the first cylinder 8 and is returned to the reservoir tank 25 via the supply/discharge control valve 22.

At this time, a small quantity of oil squeezingly flows from the cylinder chamber 8*b* into the cylinder chamber 8*a* through the gap g. However, this has substantially no effect on the increased pressure in the cylinder chamber 8*b*. The increased pressure acts on the piston 10 in the direction which causes the piston 10 to move to the left in the drawing. The rigid balls 13*a* and 13*b* move relatively along the spiral grooves 11*a* and 11*b*, causing the piston 10 to rotate relative to the first cylinder 8 while moving to the left (in the axial direction) in the drawing.

As the piston 10 moves in the axial direction and rotates relative to the first cylinder 8, the piston rod 14 and the piston 16 connected to the piston rod 14 also move in the axial direction and rotate relative to the first cylinder 8. At this time, the piston 16 is restricted from rotating relative to the second cylinder 9 due to the engagement between the rigid balls 18*a*, 18*b* and the grooves 17*a*, 17*b* extending in the axial direction. Therefore, the second cylinder 9 is also caused to rotate. However, since the piston 16 moves relative to the second cylinder 9 in the axial direction, the shaft portion 4*a* of the first stabilizer 4 and the shaft portion 5*a* of the second stabilizer 5 rotate in the opposite directions, as shown by the arrows in the drawing, without approaching to each other in the left/right direction of the drawing.

Note that FIG. 5 shows the embodiment in a state after the first cylinder 8 and the second cylinder 9 have rotated in the opposite directions. Note also that illustration of the rigid ball 13*a* (13*b*) and groove 11*a* (11*b*) constituting the linear motion-rotary motion conversion mechanism and the rigid ball 18*a* (18*b*) and groove 17*a* (17*b*) constituting the axial motion permitting mechanism is omitted in the drawing.

As described above, the first stabilizer 4 and the second stabilizer 5 rotate in the opposite directions, thereby generating a rotary angle difference therebetween. As a result, torsional elasticity is generated in the stabilizer device 1. This torsional elasticity acts to push the left wheels downward and pull the right wheels upward. Therefore, the stabilizer device 1 is able to actively suppress rolling motion which causes the left side of the vehicle body to go down when the vehicle performs a right turn.

[Return to the Position (B) (At End of Rolling Control)]

When the control device 28 determines that the vehicle has finished turning, based upon the received detection signals from the vehicle speed sensor 29, the lateral acceleration sensor 30, and the steering angle sensor 31, or put in another way, when it determines that an estimated rolling angle has fallen below the threshold, the control device 28 drives the supply/discharge control valve 22 in the manner described below.

When the supply/discharge control valve 22 is in the position (A), the control device 28 momentarily outputs the driving current IC to position the supply/discharge control valve 22 at the position (C), whereby oil is introduced into the cylinder chamber 8*b*. As a result, the piston 10 returns to the neutral position in the first cylinder 8. The control device 28 then outputs the driving current IB to the supply/discharge control valve 22 in order to return the supply/discharge control valve 22 to the position (B).

When the supply/discharge control valve 22 is at the position (C), the control device 28 momentarily outputs the driving current IA to position the supply/discharge control valve 22 at the position (A), whereby oil is introduced into the cylinder chamber 8*a*. As a result, the piston 10 returns to the neutral position in the first cylinder 8. The control device 28 then outputs the driving current IB to the supply/discharge control valve 22 in order to return the supply/discharge control valve 22 to the position (B).

By driving the supply/discharge control valve 22 in this manner, the rotary angle difference between the first stabilizer 4 and the second stabilizer 5 can be returned to substantially zero at the end of rolling control.

At this time, the rotary angle difference between the first stabilizer 4 and the second stabilizer 5 cannot be set to exactly zero. However, as the vehicle travels straight, the first stabilizer 4 and the second stabilizer 5 are subjected to vibrations from the left and right wheels. Also, when the vehicle is stationary, the first stabilizer 4 and the second stabilizer 5 receive the vehicle weight from the left and right wheels. As a result, the first stabilizer 4 and the second stabilizer 5 are contorted in the directions in which a rotary angle difference will become zero. As a result, the oil flows through the gap g in the first cylinder 8, and hence the rotary angle difference can be brought even closer to zero.

According to the first embodiment of the present invention as described above, a pressure differential is generated between the cylinder chambers 8*a* and 8*b* by supplying and discharging oil to and from the first cylinder 8. This enables the piston 10 to rotate relative to the first cylinder 8 while moving relative to the first cylinder 8 in the axial direction. At this time, the second cylinder 9 and the shaft portion 4*a* also rotate relative to the first cylinder 8 via the piston rod 14 and the piston 16, whereby the shaft portions 4*a* and 5*a* constituting the stabilizer 2 rotate in the opposite directions. As a result, torsional elasticity can be generated in the stabilizer device 1, actively suppressing rolling motion of the vehicle body.

Further, since a linear type cylinder device, in which the piston 10 moves relative to the first cylinder 8 in the axial direction, is used as the actuator 3 of the stabilizer device 1, sealing can be easily achieved. As a result, degradation of the torsional elasticity of the stabilizer caused by oil leakage can be suppressed, whereby degradation of the ability to control rolling of the vehicle body can be suppressed.

Moreover, the diametrical dimension of the actuator 3 can be made smaller than that of the rotary actuator of the prior art. Therefore, the stabilizer device 1 requires a less mounting space.

Figure 6:
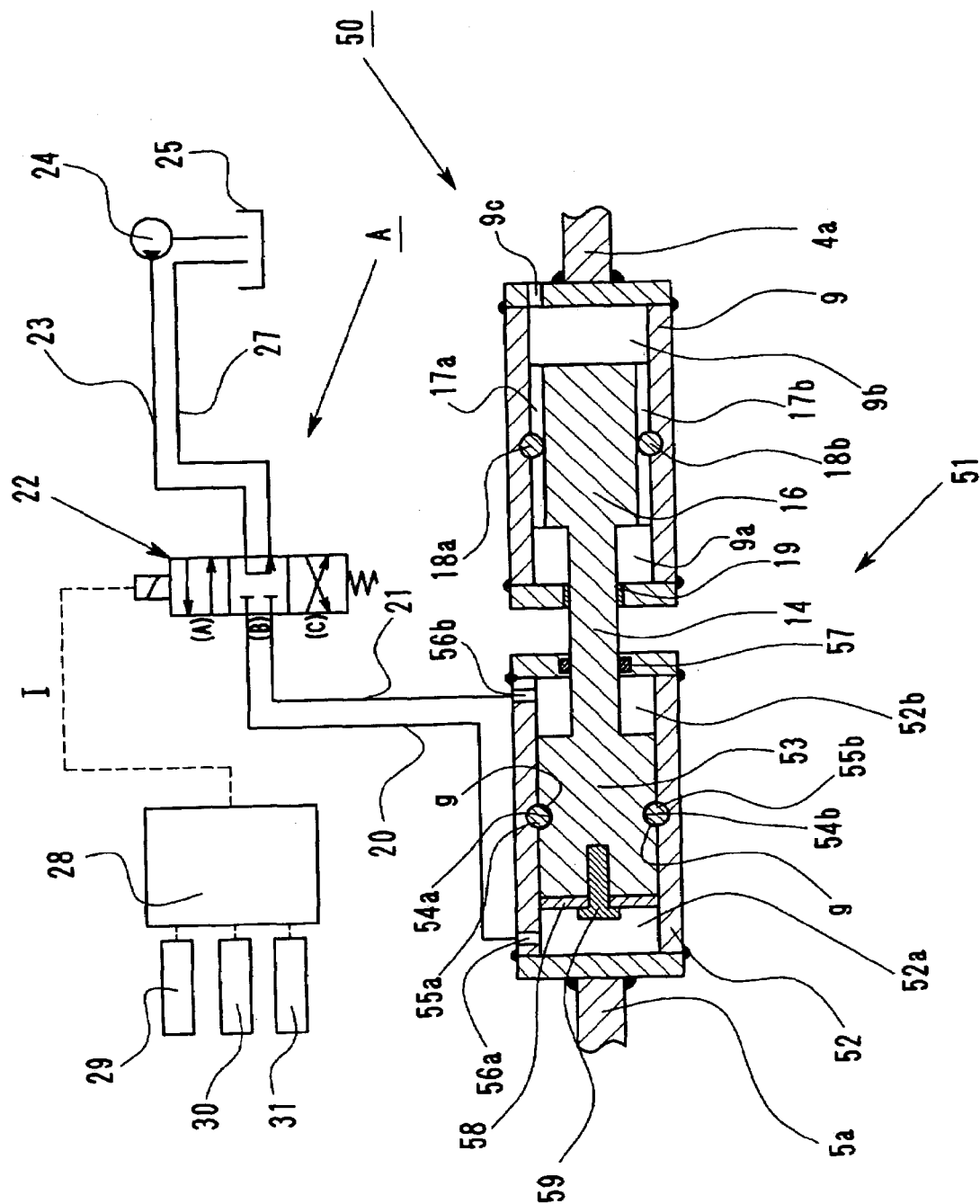
FIG. 6 is a partial sectional view showing a stabilizer device according to a second embodiment of the present invention.
Figure 7:
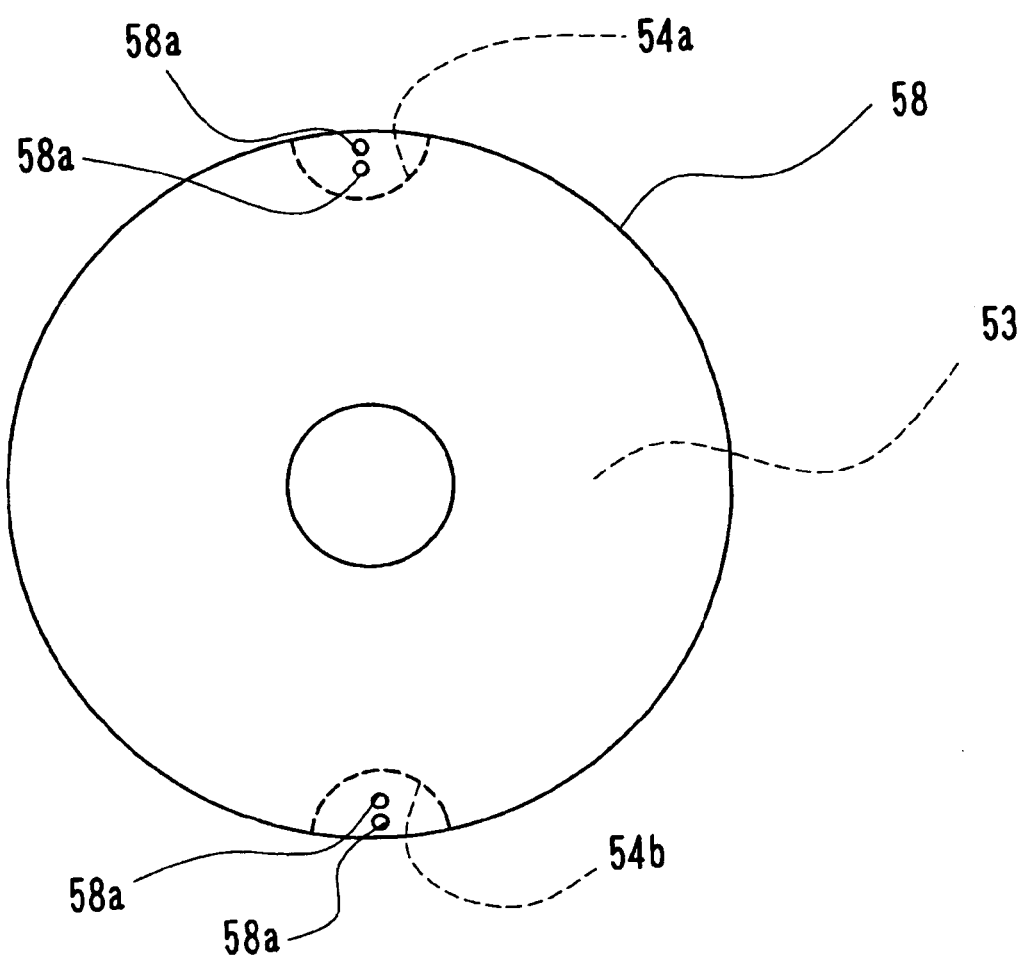
FIG. 7 is a plan view of a throttle member shown in FIG. 6.

Next, a second embodiment of the present invention will be described using FIGS. 6 and 7.

Note that for convenience, parts identical to those of the first embodiment have been referenced with the same reference numbers and symbols, and description thereof will be omitted.

A stabilizer device 50 according to the second embodiment has the first cylinder which is constructed differently than that of the stabilizer device 1 of the first embodiment described above.

A first cylinder 52 (cylinder) is provided in an actuator 51, and a piston 53, which divides the first cylinder 52 into two cylinder chambers 52a and 52b, is provided in the first cylinder 52. Spiral grooves 54a and 54b are formed in the circumference of the piston 53 in a similar manner to those formed in the piston 10 of the first embodiment.

Rigid balls 55a and 55b are partially and rotatably inserted in the inner peripheral wall of the first cylinder 52 at a position substantially bisecting the cylinder in the axial direction. The rigid balls 55a and 55b are partially received in the grooves 54a and 54b of the piston 53. The rigid balls 55a, 55b and the grooves 54a, 54b constitute the linear motion-rotary motion conversion mechanism of the present invention.

A narrow gap g is formed between the rigid balls 55a, 55b and the grooves 54a, 54b. Oil flowing between the cylinder chambers 52a, 52b is orificed by the gap g.

Supply/discharge ports 56a and 56b for supplying and discharging oil (fluid) to and from the cylinder chambers 52a, 52b are formed through the wall of the first cylinder 52 near the ends thereof as shown in the drawing. The hydraulic circuit A is connected to the supply/discharge ports 56a, 56b.

The left end of the piston rod 14 is connected to the piston 53. The central portion of the piston rod 14 extends outside of the first cylinder 52 through a sealing member 57. The sealing member 57 is constituted by an O-ring formed of an elastic body, such as rubber, and is fitted to work with the piston rod 14 to prevent an oil leak from the cylinder chamber 52b.

A restricting member 58 (restricting means) is fixed to the left end of the piston 53 as shown in the drawing by means of a screw 59. Two sets of small two orifices 58a are formed through the restricting member 58 in such a manner that each set of two orifices are aligned with one of the grooves 54a, 54b in the piston 53. The restricting member 58 is mounted on the piston 53 in such a manner that one set of two orifices 58a and one of the grooves 54a and 54b provided on the piston 53 are aligned with each other.

The total passage area of the minute orifices 58a is made smaller than the passage area of the gap g. The diameter of the restricting member 58 is made substantially equal to the inner diameter of the first cylinder 52 within a range that allows the restricting member 58 to slide within the first cylinder 52.

Since constituted as described above, the second embodiment of the present invention can achieves the same functions and effects as those the first embodiment achieves. Besides, since there is provided the restricting member 58 having passage areas smaller in total area than the passage area (restricting area) of the gap g, an oil flow flowing between the two chambers is more restricted than that of the first embodiment. As a result, a pressure difference between the two chambers can be increased with the same flow amount of oil supply and discharge as used in the first embodiment, for example. Thereby, the operating efficiency of the stabilizer device can be improved.

Figure 8:
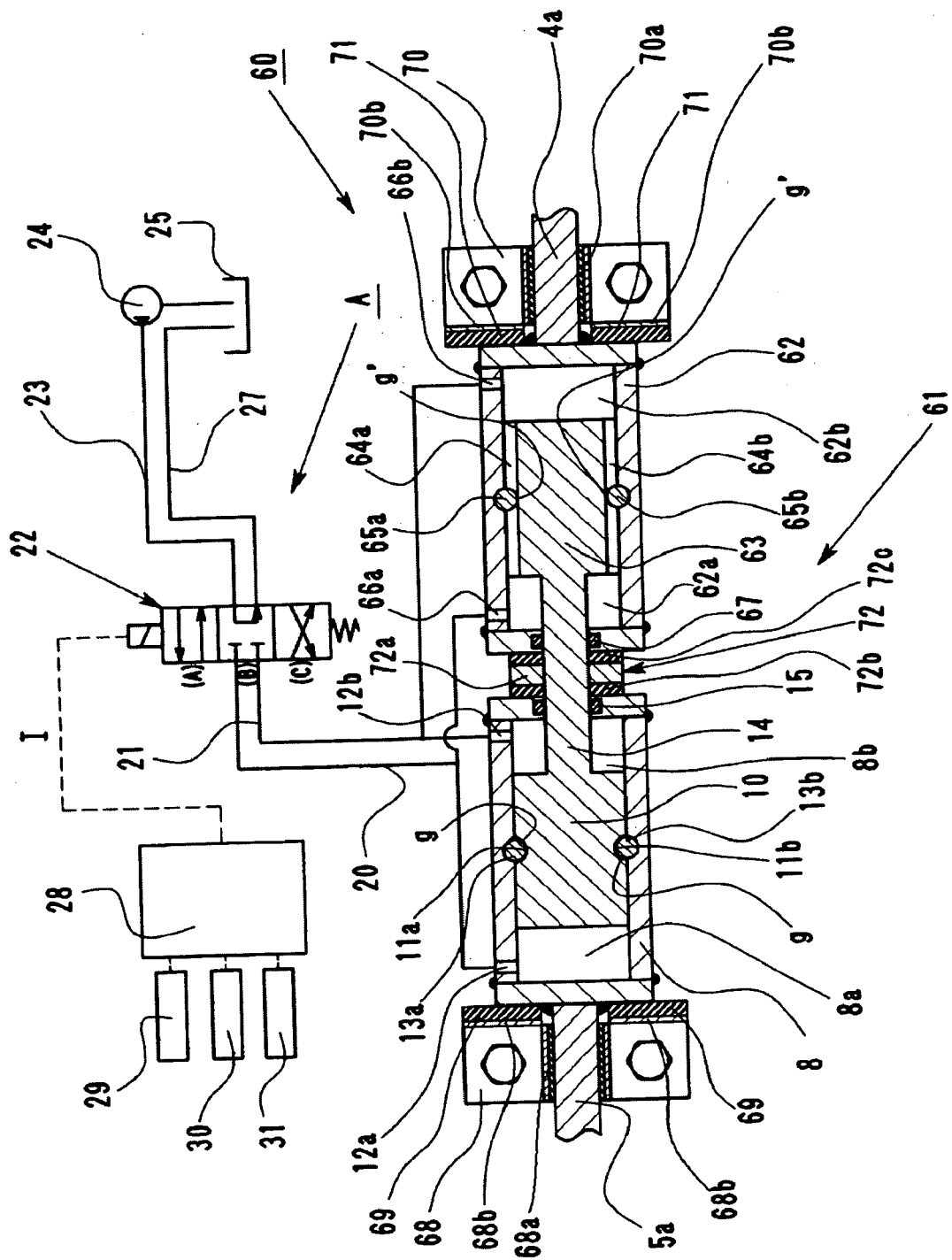
FIG. 8 is a partial sectional view showing a stabilizer device according to a third embodiment of the present invention.

Next, a third embodiment of the present invention will be described using FIG. 8.

Note that for convenience, parts identical to those of the first embodiment have been referenced by the same reference numbers and symbols, and description thereof will be omitted.

A stabilizer device 60 according to the third embodiment differs from the stabilizer device 1 of the first embodiment in that oil is also supplied to and discharged from the second cylinder provided in the actuator, the bearing member for mounting the stabilizer device on the vehicle body is modified, and a bearing member is provided between the first cylinder and the second cylinder to support the two cylinders in a manner that enables the two cylinders to rotate relatively in the axial direction.

A second cylinder 62 is provided in an actuator 61, and a piston 63 (second piston), which divides the second cylinder 62 into two cylinder chambers 62a and 62b, is provided in the second cylinder 62. Grooves 64a and 64b extending in the axial direction are formed in the circumference of the piston 63 in a similar manner the grooves are formed in the second cylinder 9 in the first embodiment.

Rigid balls 65a and 65b are partially and rotatably inserted in the inner peripheral wall of the second cylinder 62 at a position substantially bisecting the cylinder in the axial direction. The rigid balls 65a and 65b are partially received in the grooves 64a and 64b of the piston 63. The rigid balls 65a, 65b and the grooves 64a, 64b constitute the axial motion permitting mechanism of the present invention.

A narrow gap g' is formed between the rigid balls 65a, 65b and the grooves 64a, 64b. Oil flowing between the cylinder chambers 62a, 62b is restricted by the gap g'. Here, the passage area of the gap g' in the second cylinder 62 may be made equal to, smaller than, or greater than the passage area of the gap g in the first cylinder 8.

Supply/discharge ports 66a and 66b for supplying and discharging oil (fluid) to and from the cylinder chambers 62a, 62b are formed through the wall of the second cylinder 62 near the ends thereof as shown in the drawing. The supply/discharge pipes 20 and 21 of the hydraulic circuit A are connected to the supply/discharge ports 66a, 66b, respectively.

The right end of the piston rod 14 is connected to the piston 63. The central portion of the piston rod 14 extends outside of the second cylinder 62 through a sealing member 67. The sealing member 67 is constituted by an O-ring formed of an elastic body, such as rubber, and is fitted to work with the piston rod 14 to prevent an oil leak from the cylinder chamber 62a.

A bearing member 68 which restricts the first cylinder 8 from moving to the left in the axial direction is provided to the base side of the first cylinder 8 (the left side thereof in the drawing) and fixed to the vehicle body. The bearing member 68 rotatably secures the shaft portion 5a to the vehicle body via an elastic member 68a. The bearing member 68 comprises a receiving portion 68b which is formed by bending the bearing member 68 near the first cylinder 8 side. A bearing body 69 formed of a material having a low frictional resistance, such as polytetrafluoroethylene, is provided between the receiving portion 68b and the base portion of the first cylinder 8.

A bearing member 70 which restricts the second cylinder 62 so as to move only to the right in the axial direction is provided to the base portion of the second cylinder 62 (the right side thereof in the drawing) and fixed to the vehicle body. The bearing member 70 rotatably secures the shaft portion 4*a* to the vehicle body via an elastic member 70*a*. A receiving portion 70*b* is formed on the bearing member 70 by bending the bearing member 70 near the second cylinder 62 side, and a bearing body 71 formed from a material having a low frictional resistance, such as polytetrafluoroethylene, for example, is provided between the receiving portion 70*b* and the base portion of the second cylinder 62.

Between the first cylinder 8 and the second cylinder 62, a bearing member 72 is provided that supports the two cylinders in the axial direction (the left/right direction in the drawing) for relative rotation therebetween. The piston rod 14 is inserted through the bearing member 72. The bearing member 72 is constituted by a bearing main body 72*a*, and bearing bodies 72*b* and 72*c* provided between the two ends of the bearing main body 72*a* and the first cylinder 8 and second cylinder 62 respectively.

In the third embodiment, the bearing members 68, 70, and 72 are provided to prevent the first cylinder 8 and the second cylinder 62 from moving axially. This is to ensure that the linear motion of the piston 63, the piston rod 14, and the piston 10 (first piston), which is caused by supplying and discharging oil to and from the second cylinder 62, is converted smoothly into the rotary motion of the first cylinder 8. Without this restriction, the linear motion described above cannot be converted smoothly into rotary motion, and hence the first cylinder 8 and the second cylinder 62 approach to each other and separate from each other, degrading the ability to control rolling of the vehicle body.

According to the third embodiment of the present invention constituted as described above, in addition to the actions and the effects of the first embodiment, oil can be supplied to and discharged from both the first cylinder 8 and the second cylinder 62, and hence when the piston 10 moves relative to the first cylinder 8 in the axial direction, a greater force can be generated than in the first embodiment, where oil is supplied to and discharged from only one of the cylinders. Accordingly, the stabilizer device can be driven by a low power consumption type hydraulic pump with a low discharge pressure, for example.

Figure 9:
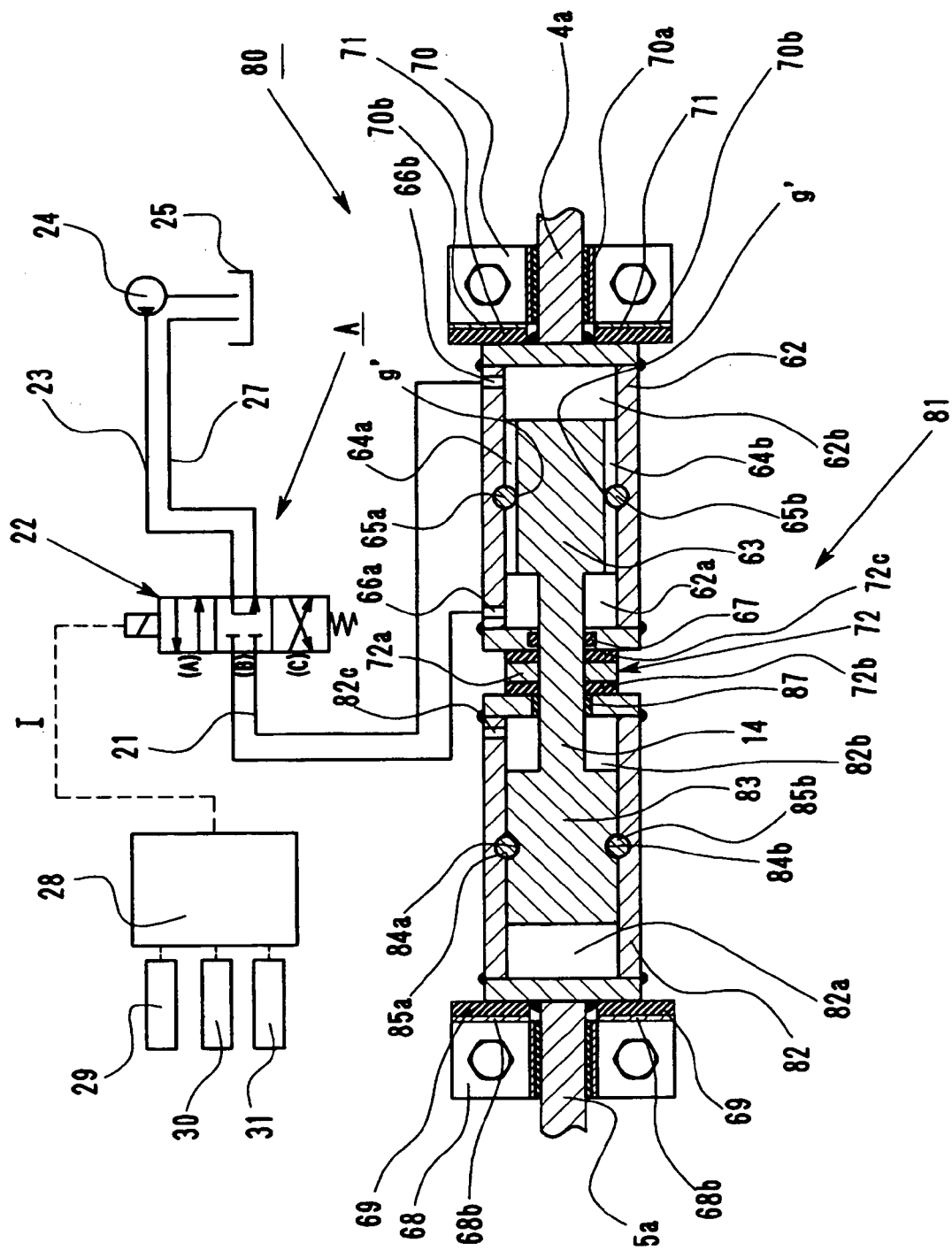
FIG. 9 is a partial sectional view showing a stabilizer device according to a fourth embodiment of the present invention.

Next, a fourth embodiment of the present invention will be described using FIG. 9.

Note that for convenience, parts identical to those in the third embodiment are referenced by the same reference numbers and symbols, and description thereof will be omitted.

A stabilizer device 80 according to the fourth embodiment differs from the stabilizer device 60 of the third embodiment in that the first cylinder provided in the actuator is modified, and that the first cylinder is separated from the hydraulic circuit A.

A piston, 83 which divides a first cylinder 82 provided in an actuator 81 into two cylinder chambers 82*a* and 82*b*, is provided in the first cylinder 82. Spiral grooves 84*a* and 84*b* are formed in the circumference of the piston 83 in a similar manner that the grooves are formed in the piston 10 of the first embodiment.

Rigid balls 85*a* and 85*b* are partially and rotatably inserted in the inner peripheral wall of the first cylinder 82 at a position substantially bisecting the cylinder in the axial direction. The rigid balls 85*a* and 85*b* are also partially received in the spiral grooves 84*a* and 84*b*. The rigid balls 85*a*, 85*b* and the grooves 84*a*, 84*b* constitute the linear motion-rotary motion conversion mechanism of the present invention. This linear motion-rotary motion conversion mechanism is connected to the piston rod 14 via the piston 83, and to the shaft portion 5*a* via the first cylinder 82, and thus connects the piston rod 14 to the shaft portion 5*a*.

The interior of the first cylinder 82 communicates with the atmosphere through a communication hole 82*c*. The communication hole 82*c* enables volume compensation when the piston rod 14 is inserted into and withdrawn from the first cylinder 82.

The left end side of the piston rod 14 is connected to the piston 83. The central portion of the piston rod 14 extends outside of the first cylinder 82 through a bearing 87. Note that the bearing 87 is formed of a material having low frictional resistance, such as polytetrafluoroethylene.

According to the fourth embodiment of the present invention constituted as described above, the linear motion of the piston 63 relative to the second cylinder 62 is transmitted to the piston 83, whereupon the linear motion of the piston 83 is converted into a rotary motion of the first cylinder 82 by the rigid ball 85*a* (85*b*) and the groove 84*a* (84*b*) (the linear motion-rotary motion conversion mechanism). As a result, the first stabilizer 4 and the second stabilizer 5 rotate in the opposite directions, enabling the generation of a rotary angle difference between the two.

Note that in each of the embodiments described above, examples were illustrated in which no sealing member is provided to the piston, and a pressure difference produced between the two cylinder chambers in accordance with the gap g (g') is used to shift the piston relative to the cylinders. However, the present invention is not limited to this constitution, and for example, the small orifices 58*a* in the restricting member 58 of the second embodiment may be removed, and a sealing member may be provided on the outer periphery of the restricting member 58 in such a manner that the piston 53 and the first cylinder 52 are sealed, thereby sealing the two cylinder chambers 52*a*, 52*b*. In this case, an oil flow between the two cylinder chambers 52*a*, 52*b* can be eliminated, and hence the operating efficiency of the stabilizer device can be improved. Note, however, that in this case, the rotary angle difference between the first stabilizer and second stabilizer is zero, that is, the neutral position (see FIGS. 1, 3, 6, 8, and 9) must be detected and the piston must be returned to the neutral position when rolling control is complete. To detect the neutral position in this case, a rotary encoder or the like, which may be of a contact type or an optical type, may be provided between the first cylinder and the second cylinder so that the relative rotation of the two cylinders can be detected.

Figure 2:
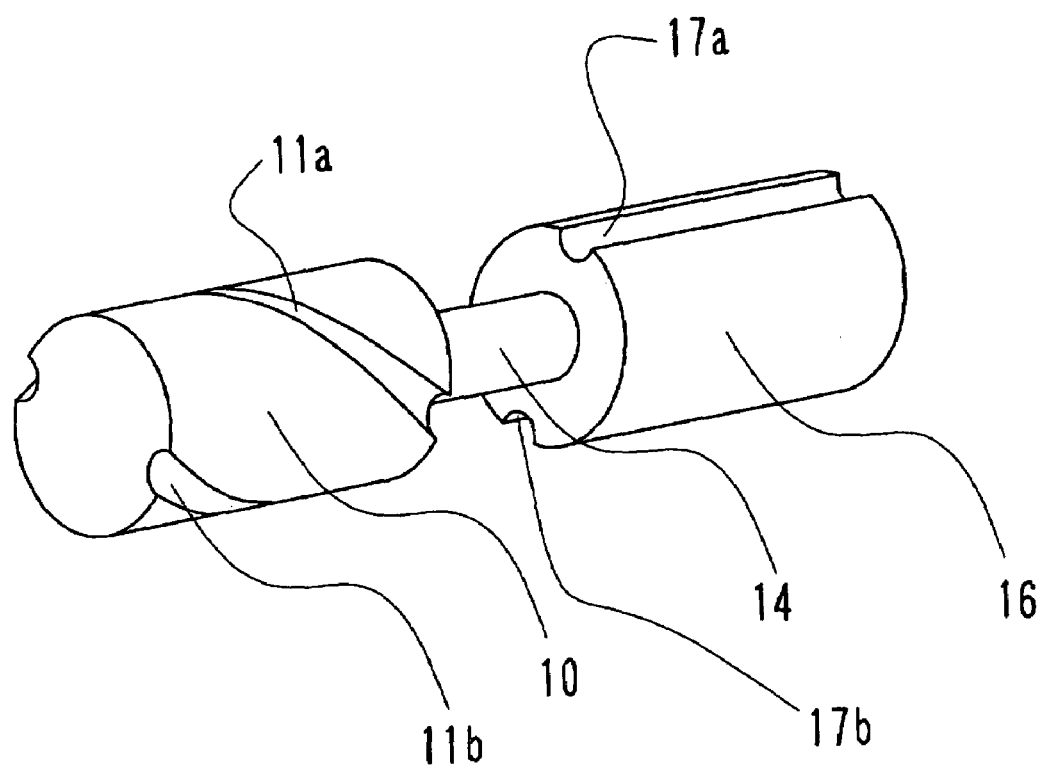
FIG. 2 is a perspective view illustrating the form of a groove of a piston and a piston rod shown in FIG. 1.

Also in the embodiments described above, the angle of the spiral grooves with respect to the piston axis is as illustrated in FIG. 2, but the present invention is not limited to this, and the angle of the spiral grooves with respect to the piston axis may be made greater, for example. In this case, the amount of torsion between the stabilizers decreases in each of the embodiments, but the oil pressure during conversion of linear motion to rotary motion can be reduced. Moreover, when the angle of the spiral grooves is made greater as described above, rotation in response to the reaction force that is received from the stabilizers (reverse orientation force of the actuator) can be suppressed, and hence the torsional rigidity of the stabilizer device when rolling control is not underway can be improved, thereby enabling the normal functions of the stabilizer device to be exhibited satisfactorily.

Further, the angle of the spiral grooves with respect to the piston axis may not be constant, but rather may be changed while the piston rotates with respect to the cylinder. An example will now be described as a fifth embodiment of the present invention using FIGS. 10 through 12, in which the angle of the spiral grooves is changed during the relative rotation of the piston In this embodiment, only the shape of the grooves 11*a* and 11*b* formed in the piston 10 differ from the first embodiment, and all other constitutions are identical to the first embodiment.

Figure 10:
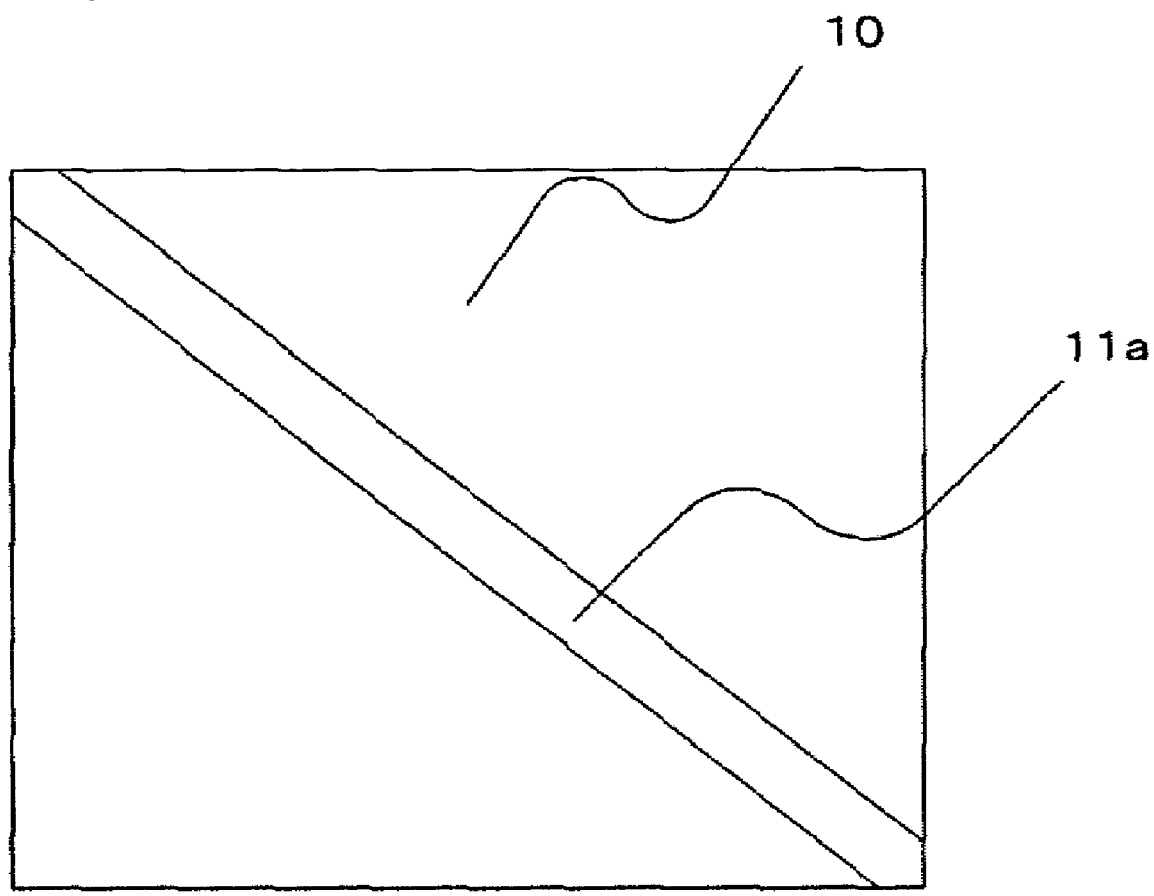
FIG. 10 is a planar development of half of the perimeter of a piston in a first cylinder according to the first embodiment of the present invention.

FIG. 10 shows a semi-circumferential surface, planely opened, of the piston 10 in the first embodiment. In the drawing, the groove 11*a* is formed straight. When the groove 11*a* is so made, the rotary angle and the stroke characteristics of the piston 10 have a proportional relationship as shown by the broken line in FIG. 12.

Figure 11:
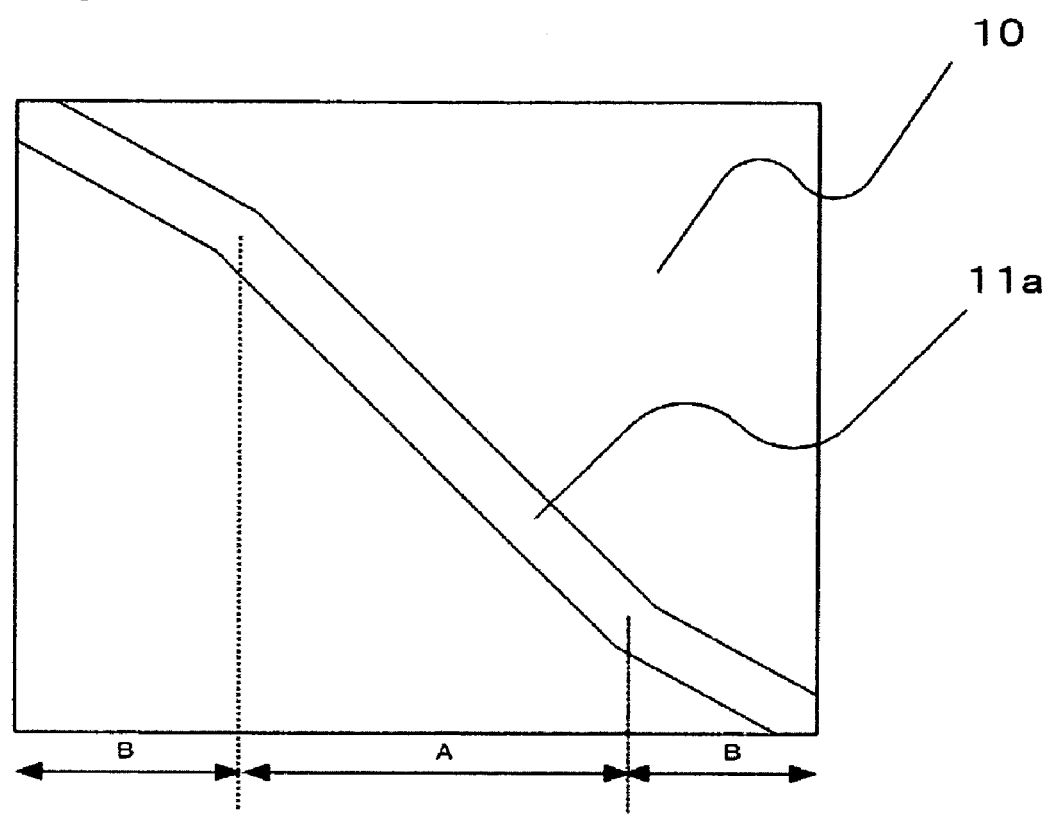
FIG. 11 is a planar development of half of the perimeter of a piston in a first cylinder according to a fifth embodiment of the present invention.
Figure 12:
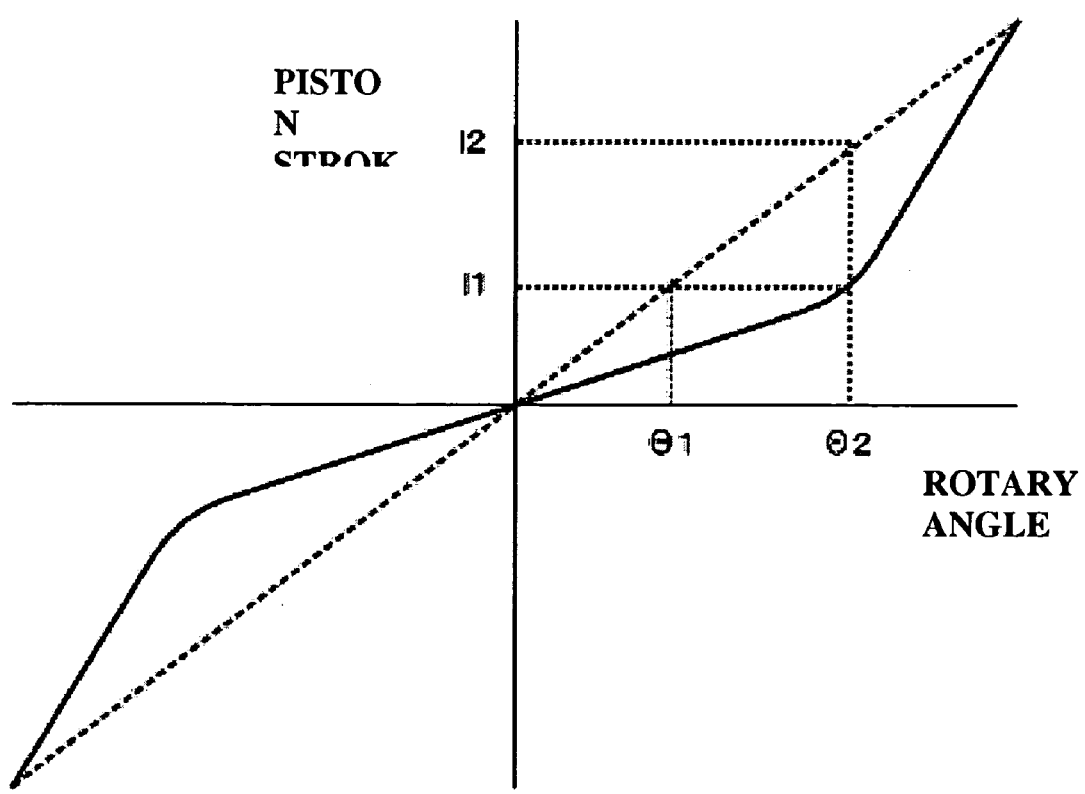
FIG. 12 is a graph showing the rotary angle and stroke characteristics of the piston in the first cylinder according to the first embodiment and fifth embodiment of the present invention.

In this embodiment, on the other hand, the angle of the grooves 11*a*, 11*b* changes along the circumference of the piston 10. FIG. 11 shows a semi-circumferential surface, planely opened, of the piston 10 in this embodiment. When the groove 11*a* is formed as such, the relationship between the rotary angle and stroke of the piston 10 is nonlinear and not proportional, as shown by the solid line in FIG. 12. Therefore, when the rotary angle of the piston 10 is small, the stroke of the piston 10 is small. As the rotary angle of the piston 10 increases, the stroke of the piston 10 increases. In other words, the linear motion-rotary motion conversion mechanism of this embodiment has a nonlinear characteristic.

As a result, in regions having a large amount of torsion (a large rotary angle), which require a greater force, rotation can be performed at a lower oil pressure. Accordingly, a pump with a low discharge pressure may be used as the hydraulic pump 24.

Figure 13:
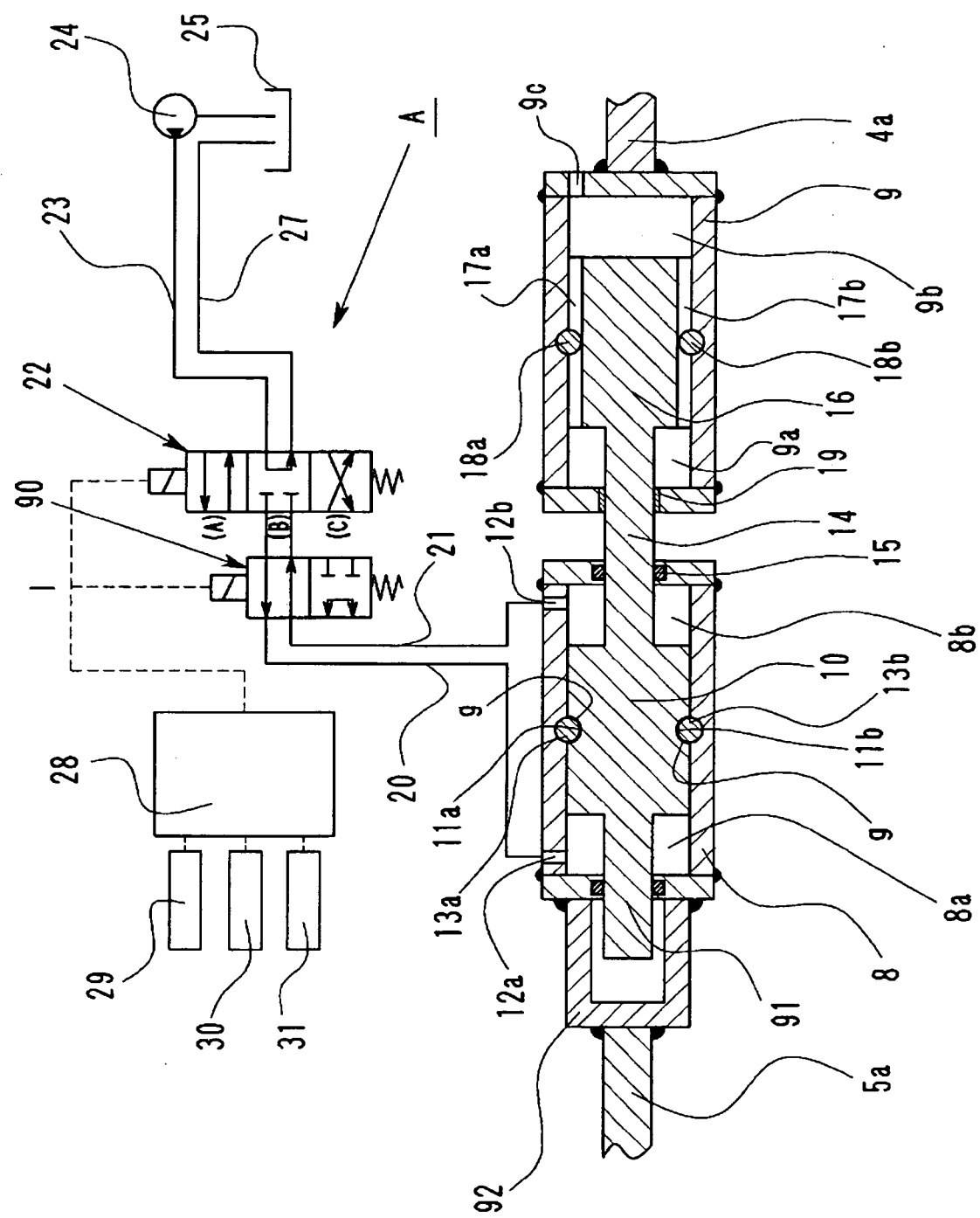
FIG. 13 is a view showing a hydraulic circuit which drives a stabilizer device according to a sixth embodiment of the present invention.

A sixth embodiment will now be described using FIG. 13.

This embodiment differs from the first embodiment in that there is a duration in which the actuator 3 is not in operation. The parts identical to those of FIG. 3 are referenced by the same reference numerals, and description thereof will be omitted.

A valve device 90 is provided between the supply/discharge control valve 22 and the first cylinder 8, which selectively enables the pressure fluid in the first cylinder 8 to be supplied and discharged freely. This valve device 90 switches between a shorted state in which the supply/discharge pipes 20 and 21 communicate with each other but are disconnected from the supply/discharge control valve 22 (thereby enabling the pressure fluid inside the first cylinder 8 to be supplied and discharged freely), and a normal state in which the supply/discharge pipes 20 and 21 are disconnected from each other but communicate with the supply/discharge control valve 22.

Further, a rod 91 is provided on the cylinder chamber 8*a* side of the piston 10, so that the first cylinder 8 and the piston 10 are able to operate in the shorted state. As a result, when the piston 10 moves, the amount of increase in the volume of the cylinder chamber 8*a* and the amount of decrease in the volume of the cylinder chamber 8*b* become equal, thereby enabling the piston 10 to move in the shorted state.

A reverse C-shaped bracket 92 is also provided for connecting the shaft portion 5*a* to the first cylinder 8.

By means of this constitution, the functions of the stabilizer device can be eliminated in the shorted state. This is effective while traveling on extremely bad roads or the like, when the stabilizer device has an adverse effect.

The nonlinear groove 11*a* shown in FIG. 11 of the fifth embodiment may also be provided in the sixth embodiment. In this case, displacement from sprung mass (wheel side) of the vehicle is small when traveling on a normal road having a mainly even surface in the shorted state. As a result, the amount of torsion in the stabilizer 2 also decreases. While traveling straight on a normal road having few bumps, control of the stabilizer device 1 is unnecessary. Rather, while traveling straight on a normal road, the stabilizer 2, if it functions, will degrade riding comfort. Therefore, while a vehicle is traveling straight on a normal road, the stabilizer 2 should be controlled such that the wheel shafts can naturally move as if the stabilizer 2 were not functioning. In the shorted state when the groove 11*a* having the form shown in FIG. 11 is provided, the stroke of the piston 10 and piston rod 14 in a linear direction decreases, and hence the inertial force of the piston 10 and the piston rod 14 can be reduced, thus improving riding comfort (see the section in FIG. 11 denoted by A).

Moreover, when the piston 10 rotates greatly in the normal state, the stroke of the piston 10 and the piston rod 14 in a linear direction increases, but only a small rotary force is required, and force acting on the rigid balls 13*a*, 13*b* fitted in the piston 10 decreases. As a result, the durability of the stabilizer device 1 improves.

Furthermore, in the embodiments described above, examples were described in which one of the two cylinder chambers is provided with the piston rod, and the other is not, and the volumes of the cylinder chambers are different. However, the present invention is not limited thereto. A so-called double-rod system may be employed so that the volumes of the two cylinder chambers are equal.

Further, in each of the embodiments described above, the linear motion-rotary motion conversion mechanism of the present invention is constituted by a rigid ball and a spiral groove, but the present invention is not limited thereto, and the linear motion-rotary motion conversion mechanism may be constituted using a ball screw mechanism, for example.

Further, in each of the embodiments described above, the axial motion permitting mechanism of the present invention is constituted by a rigid ball and a groove extending axially. But the present invention is not limited thereto The axial motion permitting mechanism may be constituted in such a manner that the tip end portion of the piston rod is made crosswise in cross section, and the shaft portion is formed with a crosswise hole. When the tip end portion of the piston rod is inserted into the hole, their relative rotation is restricted while their relative axial motion is allowable, for example.

Further, in each of the embodiments described above, the axial motion permitting mechanism of the present invention is provided between the piston rod and the shaft portion, but the present invention is not limited thereto, and the axial motion permitting mechanism may be provided between the shaft portion and a mounting member on the wheel side, for example.

What is claimed is:

1. A stabilizer device comprising a stabilizer constituted by a shaft portion mounted on a vehicle body side and arm portions which are attached to left and right vehicle wheel sides by bending each side of the shaft portion; and an actuator which divides the stabilizer into two at the shaft portion and produces a rotary angle difference between the shaft portions thus divided, wherein the actuator comprises:
a cylinder connected to one of the shaft portions;
a piston provided within the cylinder so as to be capable of movement in an axial direction, the piston dividing the interior of the cylinder into two chambers to and from which a pressure fluid is supplied and discharged;

a piston rod having one end connected to the piston and another end extending outward from the cylinder to be connected to the other shaft portion;

a linear motion-rotary motion conversion mechanism which causes the piston and the piston rod to rotate relative to the cylinder when the piston moves in the axial direction; and an axial motion permitting mechanism which prohibits relative rotation but permits relative axial motion, wherein the piston rod and the other shaft portion are connected via the axial motion permitting mechanism.

2. The stabilizer device according to claim 1, wherein the linear motion-rotary motion conversion mechanism is constituted by a spiral groove provided on the piston, and a ball provided rotatably in an inner peripheral wall of the cylinder and fitted into the spiral groove.

3. The stabilizer device according to claim 1, wherein the actuator is provided with a bearing member for restricting movement of the cylinder in the axial direction.

4. The stabilizer device according to claim 1, wherein the linear motion-rotary motion conversion mechanism has a nonlinear characteristic.

5. The stabilizer device according to claim 1, comprising a valve device which enables selection of a state in which the pressure fluid inside the cylinder can be supplied and discharged freely.

6. A stabilizer device comprising a stabilizer constituted by a shaft portion mounted on a vehicle body side and arm portions which are attached to left and right vehicle wheel sides by bending each side of the shaft portion; and an actuator which divides the stabilizer into two at the shaft portion and produces a rotary angle difference between the shaft portions thus divided, wherein the actuator comprises:

a cylinder connected to one of the shaft portions;

a piston provided within the cylinder so as to be capable of movement in an axial direction, the piston dividing the interior of the cylinder into two chambers to and from which a pressure fluid is supplied and discharged;

a piston rod having one end connected to the piston and another end extending outward from the cylinder to be connected to the other shaft portion; and a linear motion-rotary motion conversion mechanism which causes the piston and the piston rod to rotate relative to the cylinder when the piston moves in the axial direction, wherein the linear motion-rotary motion conversion mechanism has a nonlinear characteristic.

7. The stabilizer device according to claim 6, wherein the linear motion-rotary motion conversion mechanism is constituted by a spiral groove provided on the piston, and a ball provided rotatably in an inner peripheral wall of the cylinder and fitted into the spiral groove, the spiral groove being formed angularly non-linearly in a circumference of the piston.

8. A stabilizer device comprising a stabilizer constituted by a shaft portion mounted on a vehicle body side and arm portions which are attached to left and right vehicle wheel sides by bending each side of the shaft portion, and an actuator which divides the stabilizer into two at the shaft portion and produces a rotary angle difference between the shaft portions thus divided, wherein the actuator comprises:

a cylinder connected to one of the shaft portions; a piston provided within the cylinder so as to be capable of movement in an axial direction, the piston dividing the interior of the cylinder into two chambers to and from which a pressure fluid is supplied and discharged;

a piston rod having one end connected to the piston and another end extending outward from the cylinder; and an axial motion permitting mechanism which prohibits relative rotation but permits relative axial motion of the piston and the piston rod relative to the cylinder, the piston rod and the other shaft portion being connected via a linear motion-rotary motion conversion mechanism which converts the axial motion of the piston rod into a rotary motion toward the other shaft portion.

9. The stabilizer device according to claim 8, wherein the axial motion permitting mechanism is constituted by a groove provided on the piston and extending in the axial direction of the piston, and a ball provided rotatably in an inner peripheral wall of the cylinder and fitted into the groove extending in the axial direction.

10. The stabilizer device according to claim 8, wherein the actuator is provided with a bearing member for restricting movement of the cylinder in the axial direction.

11. The stabilizer device according to claim 8, wherein the linear motion-rotary motion conversion mechanism has a nonlinear characteristic.

12. A stabilizer device comprising a stabilizer constituted by a shaft portion mounted on a vehicle body side and arm portions which are attached to left and right vehicle wheel sides by bending each side of the shaft portion, and an actuator which divides the stabilizer into two at the shaft portion and produces a rotary angle difference between the shaft portions thus divided, wherein the actuator comprises:

a first cylinder connected to one of the shaft portions, and a second cylinder connected to the other shaft portion;

a first piston and a second piston provided in the respective interiors of the cylinders, the first and second pistons dividing each of the cylinders into two chambers; a piston rod provided such that the opposite ends thereof are connected to the respective pistons;

a linear motion-rotary motion conversion mechanism which causes the first piston and the piston rod to rotate relative to the first cylinder when the first piston moves in the axial direction; and an axial motion permitting mechanism which prohibits relative rotation but permits relative axial motion of the second piston and the piston rod relative to the second cylinder, pressure fluid being supplied to and discharged from at least either the two chambers of the first cylinder or the two chambers of the second cylinder.

13. The stabilizer device according to claim 12, wherein pressure fluid is supplied to and discharged from the two chambers of the first cylinder and the two hambers of the second cylinder.

14. The stabilizer device according to claim 12, wherein the linear motion-rotary motion conversion mechanism is constituted by a spiral groove provided on the first piston, and a ball provided rotatably in an inner peripheral wall of the first cylinder and fitted into the spiral groove.

15. The stabilizer device according to claim 13, wherein the linear motion-rotary motion conversion mechanism is constituted by a spiral groove provided on the first piston, and a ball provided rotatably in an inner peripheral wall of the first cylinder and fitted into the spiral groove.

16. The stabilizer device according to claim 12, wherein the axial motion permitting mechanism is constituted by a groove provided on the second piston and extending in the axial direction of the second piston, and a ball provided rotatably in an inner peripheral wall of the second cylinder and fitted into the groove extending in the axial direction.

17. The stabilizer device according to claim 13, wherein the axial motion permitting mechanism is constituted by a groove provided on the second piston and extending in the axial direction of the second piston, and a ball provided rotatably in an inner peripheral wall of the second cylinder and fitted into the groove extending in the axial direction.

* * * * *